L. Chapman,
Wrench,
Nº 82,085. Patented Sept. 15, 1868.
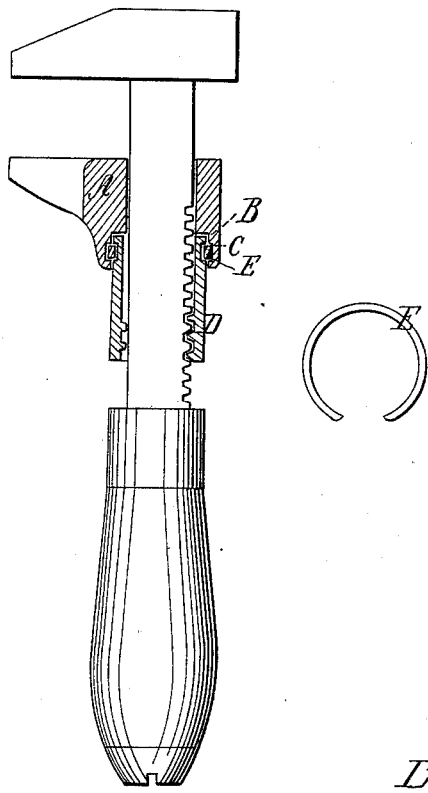
Witnesses;
Mr A. Morgan
G. C. Cotton
Inventor;
Luke Chapman
per Munn & Co
Attorneys

United States Patent Office.

LUKE CHAPMAN, OF COLLINSVILLE, CONNECTICUT.

Letters Patent No. 82,085, dated September 15, 1868.

IMPROVEMENT IN WRENCHES.

The Schedule referred to in these Letters Patent and making part of the same.

TO ALL WHOM IT MAY CONCERN:

Be it known that I, LUKE CHAPMAN, of Collinsville, in the county of Hartford, and State of Connecticut, have invented a new and useful Improvement in Wrenches; and I do hereby declare that the following is a full, clear, and exact description thereof, which will enable others skilled in the art to make and use the same, reference being had to the accompanying drawings, forming part of this specification, in which—

Figure 1 represents a side elevation of a wrench constructed according to my improvement, with the sliding jaw and nut shown in section, and Figure 2 represents a spring-ring, such as is used to connect the two parts together.

Similar letters of reference indicate like parts.

The object of this invention is to provide an improvement in wrenches, whereby the method of constructing them may be simplified and cheapened.

It consists of an improved method of connecting the nut and sliding jaw together.

A represents the sliding jaw, which is provided with a recess, B, in the end, and an annular groove, C, in the said recessed end.

D represents the nut, which is provided, at the end which enters the recess B, for connecting it with the jaw, with an annular groove, of corresponding breadth with that in the jaw, but of greater depth. These grooves are designed to be coincident with each other when the parts are joined together.

E represents a spring-ring, which is inserted in the groove in the nut, and sprung into it, so as to admit it to pass into the recess B of the jaw when the end of the nut is inserted in said recess. When the spring has been inserted as far as the groove C, it will spring into it, and thus prevent the nut from being withdrawn, while it will admit it to rotate freely.

By means of this arrangement, the parts are more simply and cheaply connected together, and it admits also of constructing the jaw of wrought metal, instead of cast or malleable iron, as they are now mostly made.

Having thus described my invention, I claim as new, and desire to secure by Letters Patent—

The combination, with the jaw A, provided with the recess B and annular groove C, of the nut D and the spring-ring E, substantially as and for the purpose set forth.

LUKE CHAPMAN.

Witnesses:
 WILLIAM W. BIDWELL,
 ALBERT DAVISON.